US008009550B2

(12) United States Patent
Döttling et al.

(10) Patent No.: US 8,009,550 B2
(45) Date of Patent: *Aug. 30, 2011

(54) METHOD AND COMMUNICATIONS DEVICE FOR ADAPTING THE DATA TRANSFER RATE IN A COMMUNICATIONS DEVICE

(75) Inventors: Martin Döttling, Neubiberg (DE); Bernhard Raaf, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 1793 days.

This patent is subject to a terminal disclaimer.

(21) Appl. No.: 10/510,896

(22) PCT Filed: Apr. 1, 2003

(86) PCT No.: PCT/DE03/01061
§ 371 (c)(1),
(2), (4) Date: Oct. 8, 2004

(87) PCT Pub. No.: WO03/085873
PCT Pub. Date: Oct. 16, 2003

(65) Prior Publication Data
US 2005/0141549 A1 Jun. 30, 2005

(30) Foreign Application Priority Data

Apr. 8, 2002 (DE) .................................. 102 15 380
Apr. 29, 2002 (DE) .................................. 102 19 151

(51) Int. Cl.
*H04J 11/00* (2006.01)
(52) U.S. Cl. ........................................ 370/208; 714/755
(58) Field of Classification Search .......... 370/203–208; 714/755
See application file for complete search history.

(56) References Cited

U.S. PATENT DOCUMENTS

| 5,553,081 | A | * | 9/1996 | Downey et al. | ............... 714/709 |
| 5,832,001 | A | * | 11/1998 | Choi | ............................ 714/790 |
| 5,878,061 | A | * | 3/1999 | Hauck et al. | .................. 714/800 |

(Continued)

FOREIGN PATENT DOCUMENTS

DE 10038229 3/2001

(Continued)

OTHER PUBLICATIONS

3GPP TS 25.212 V5.0.0 "$3^{rd}$ Generation Partnership Project; Technical Specification Group Radio Access Network; Multiplexing and Channel Coding (FDD)" Release 5, Technical Specification. 3GPP Organizational Partners (74 pages), Mar. 1, 2002.

(Continued)

*Primary Examiner* — Phuc Tran
(74) *Attorney, Agent, or Firm* — King & Spalding L.L.P.

(57) ABSTRACT

A method is provided for adapting the data transfer rate of a data flow in a communication device according to which: the data flow can be subdivided into at least one data block containing transmission bits to be transmitted; the transmission bits are formed by a coding process from information-carrying input bits; transmission bits determined from a data block of the data flow are removed (punctured) in order to adapt the data transfer rate; a puncturing pattern stipulates which transmission bits are to be removed, and; the puncturing pattern is constructed in such a manner that transmission bits are preferably removed that, during the coding process, depend on few input bits. The present invention also relates to a corresponding communication device.

9 Claims, 21 Drawing Sheets

U.S. PATENT DOCUMENTS

| | | | |
|---|---|---|---|
| 6,601,214 B1* | 7/2003 | Hammons, Jr. | 714/790 |
| 6,621,873 B1* | 9/2003 | Lee et al. | 375/295 |
| 6,671,851 B1* | 12/2003 | Moulsley | 714/790 |
| 6,675,346 B2 | 1/2004 | Tsunoda | |
| 6,751,772 B1* | 6/2004 | Kim et al. | 714/786 |
| 6,819,718 B1* | 11/2004 | Koehn et al. | 375/242 |
| 6,892,342 B2* | 5/2005 | Eroz et al. | 714/755 |
| 6,973,579 B2 | 12/2005 | Dick et al. | 713/200 |
| 7,000,173 B2* | 2/2006 | Buckley et al. | 714/790 |
| 7,050,410 B1* | 5/2006 | Kim et al. | 714/790 |
| 7,076,726 B1 | 7/2006 | Yun et al. | 714/790 |
| 7,133,688 B2* | 11/2006 | Das et al. | 455/522 |
| 7,162,675 B2 | 1/2007 | Das et al. | 714/751 |
| 2002/0138806 A1* | 9/2002 | Scalise et al. | 714/786 |
| 2002/0166093 A1* | 11/2002 | Eroz et al. | 714/790 |
| 2002/0167969 A1* | 11/2002 | Eriksson et al. | 370/469 |
| 2003/0159100 A1* | 8/2003 | Buckley et al. | 714/758 |
| 2003/0221156 A1* | 11/2003 | Berger et al. | 714/755 |
| 2004/0001428 A1* | 1/2004 | Datta et al. | 370/208 |
| 2004/0028020 A1 | 2/2004 | Frederiksen et al. | 370/342 |
| 2004/0125765 A1* | 7/2004 | Yun et al. | 370/328 |
| 2004/0181618 A1 | 9/2004 | Dottling et al. | 710/33 |
| 2005/0078648 A1 | 4/2005 | Nilsson | 370/342 |

FOREIGN PATENT DOCUMENTS

| | | |
|---|---|---|
| EP | 1091517 | 4/2001 |
| JP | 2001-57521 | 2/2001 |
| WO | WO 00/03486 | 1/2000 |
| WO | WO0021234 | 4/2000 |
| WO | WO 01/26273 | 5/2000 |
| WO | WO 00/41316 | 7/2000 |
| WO | WO 01/39421 | 5/2001 |
| WO | WO0139420 | 5/2001 |
| WO | WO0209294 | 1/2002 |

OTHER PUBLICATIONS

3GPP TSG-RAM WG1#25 Tdoc R1-02-0493 "Improved UE Specific CRC Generation" Discussion and Decision (7 pages), Feb. 9, 2002.

XP-002256033 "Change Request R1-02-0605, Rate Matching and Channel Coding for HS-SCCH" pp. 1-5 (5 pages), Apr. 12, 2002.

* cited by examiner

HS-SCCH, Part 2, Pattern 19, FER=1.1×E-02 Error Histogram

HS-SCCH, Part 2, Pattern 0, FER=1.6×E-02 Error Histogram

FIG 6
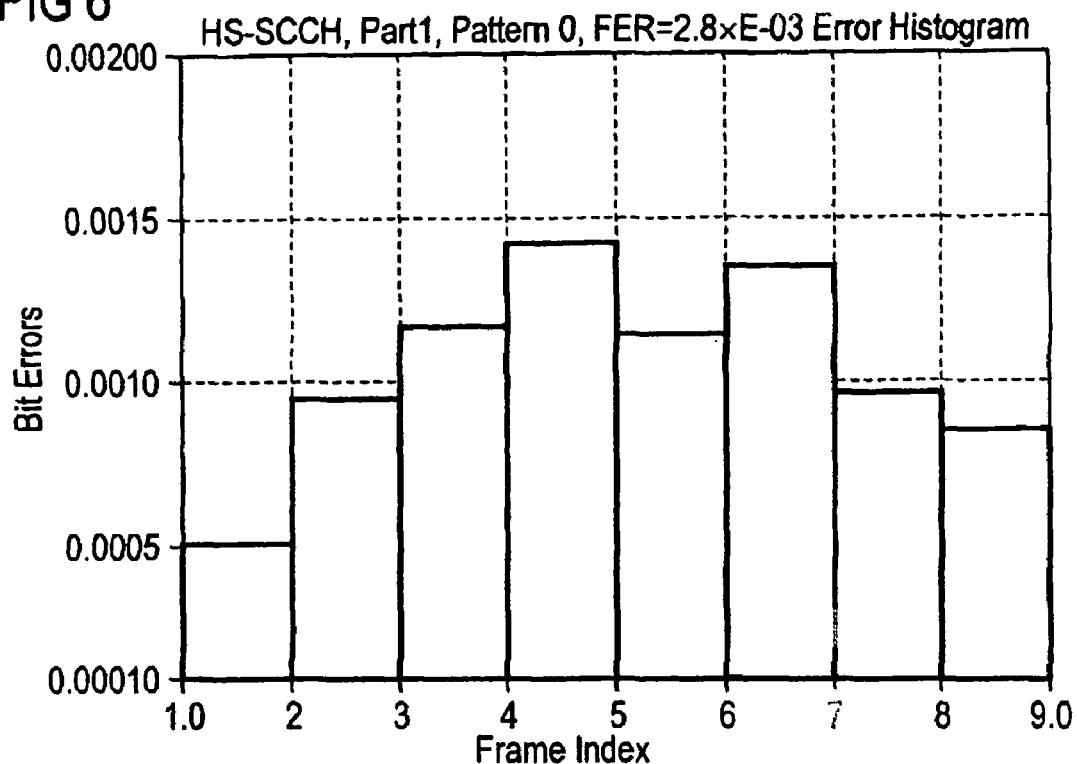
FIG 7 Cumulative puncturing level of the coded bits
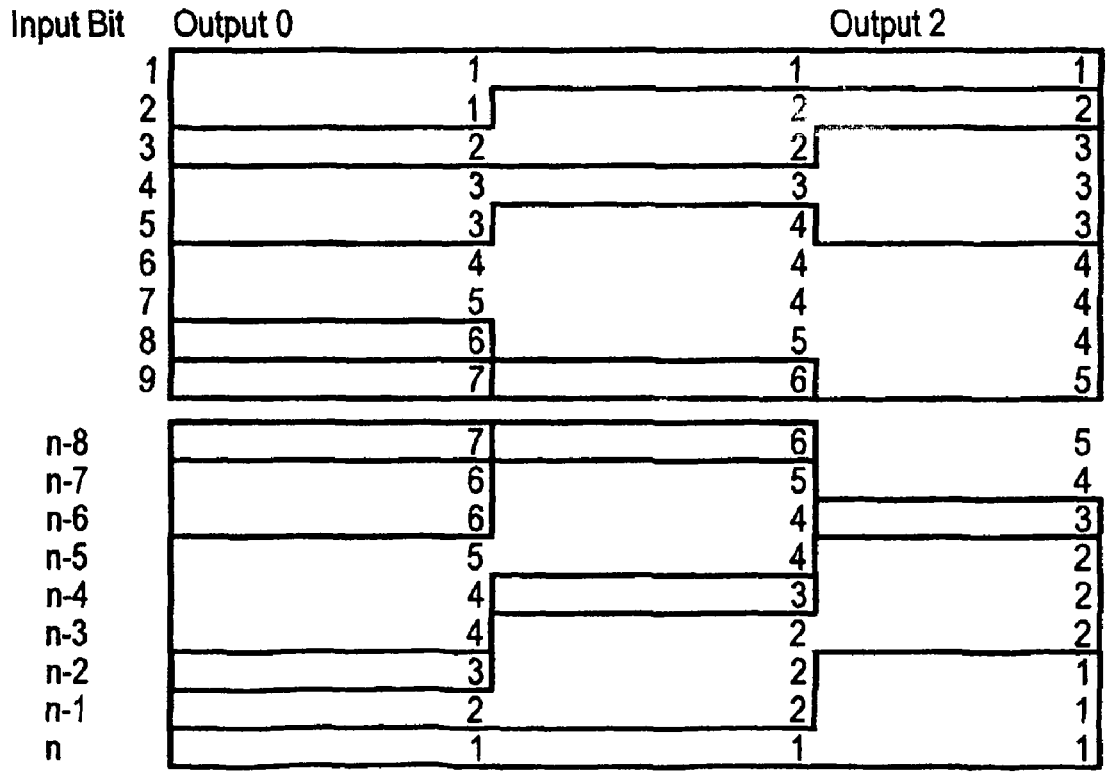

FIG 8

| Input Bit | Output 0 | Output 1 | Output 2 |
|---|---|---|---|
| | | Information bits concerned | |
| 1 | 1 | 1 | 1 |
| 2 | 2 | 2, 1 | 2, 1 |
| 3 | 3, 1 | 3, 2 | 3, 2, 1 |
| 4 | 4, 2, 1 | 4, 3, 1 | 4, 3, 2, |
| 5 | 5, 3, 2 | 5, 4, 2, 1 | 5, 4, 3, |
| 6 | 6, 4, 3, 1, | 6, 5, 3, 2 | 6, 5, 4, 1 |
| 7 | 7, 5, 4, 2, 1 | 7, 5, 4, 3 | 7, 6, 5, 2 |
| 8 | 8, 6, 5, 3, 2, 1 | 8, 6, 5, 4, 1 | 8, 7, 6, 3 |
| 9 | 9, 7, 6, 4, 3, 2, 1 | 9, 7, 6, 5, 2, 1 | 9, 8, 7, 4, 1 |
| n-8 | 0, -2, -3, -5, -6, -7, -8 | 0, -1, -3, -4, -7, -8 | 0, -1, -2, -5, -8 |
| n-7 | -1, -2, -4, -5, -6, -7 | 0, -2, -3, -6, -7 | 0, -1, -4, -7 |
| n-6 | 0, -1, -3, -4, -5, -6 | -1, -2, -5, -6 | 0, -3, -6 |
| n-5 | 0, -2, -3, -4, -5 | 0, -1, -4, -5 | -2, -5 |
| n-4 | -1, -2, -3, -4, | 0, -3, -4 | -1, -4 |
| n-3 | 0, -1, -2, -3 | -2, -3 | 0, -3 |
| n-2 | 0, -1, -2 | -1, -2 | -2 |
| n-1 | 0, -1 | 0, -1 | -1 |
| n | 0 | 0 | 0 |

FIG 9

Optimized puncturing pattern
Puncturing sequence and cumulative puncturing for max. 18 input bit

| # punct bits | Sequence | Average value | Av. P rate | Cumulative |
|---|---|---|---|---|
| 1 | 1 | 1,00 | 0,06 | 1 |
| 2 | k | 1,00 | 0,06 | 2 |
| 3 | 4 | 1,00 | 0,06 | 3 |
| 4 | k-4 | 1,00 | 0,06 | 4 |
| 5 | k-6 | 1,00 | 0,06 | 5 |
| 6 | 2 | 1,20 | 0,07 | 6 |
| 7 | k-1 | 1,40 | 0,08 | 7 |
| 8 | 3 | 1,60 | 0,09 | 8 |
| 9 | k-2 | 1,80 | 0,10 | 9 |
| 10 | 8 | 1,83 | 0,10 | 11 |
| 11 | k-15 | 1,86 | 0,10 | 13 |
| 12 | k-12 | 1,88 | 0,10 | 15 |
| 13 | k-10 | 1,89 | 0,10 | 17 |
| 14 | 7 | 2,11 | 0,12 | 19 |
| 15 | k-9 | 2,33 | 0,13 | 21 |
| 16 | k-7 | 2,56 | 0,14 | 23 |
| 17 | 5 | 2,78 | 0,15 | 25 |
| 18 | k-4 | 3,00 | 0,17 | 27 |
| 19 | 6 | 3,22 | 0,18 | 29 |
| 20 | k-5 | 3,44 | 0,19 | 31 |
| 21 | 15 | 3,09 | 0,17 | 34 |
| 22 | 12 | 3,36 | 0,19 | 37 |
| 23 | 14 | 3,64 | 0,20 | 40 |
| 24 | k-18 | 3,58 | 0,20 | 43 |
| 25 | 11 | 3,75 | 0,21 | 45 |
| 26 | k-13 | 4,00 | 0,22 | 48 |
| 27 | 10 | 4,25 | 0,24 | 51 |
| 28 | k-8 | 4,50 | 0,25 | 54 |
| 29 | 9 | 4,75 | 0,26 | 57 |

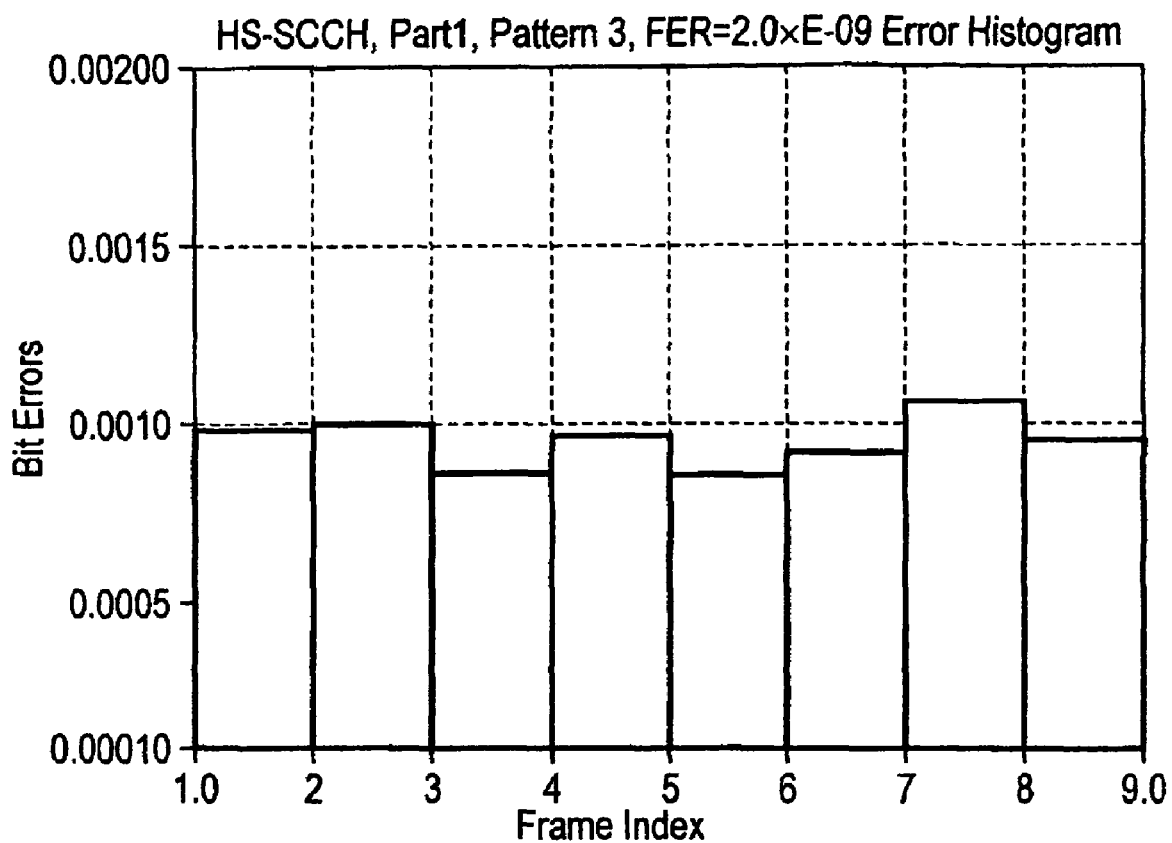

FIG 12A

| Puncturing from 111 to 80 bits, R=1/3 ||
|---|---|
| Pattern | Bits to be punctured |
| 1 | 1, 2, 3, 4, 5, 6, 7, 8, 9, 10, 11, 12, 14, 15, 24, 92, 93, 96, 98, 99, 101, 102, 103, 104, 105, 106, 107, 108, 109, 110, 111 |
| 2 | 1, 2, 3, 4, 5, 6, 7, 8, 9, 10, 11, 12, 13, 15, 24, 92, 93, 96, 98, 99, 101, 102, 103, 104, 105, 106, 107, 108, 109, 110, 111 |
| 3 | 1, 2, 3, 4, 5, 6, 7, 8, 9, 10, 11, 12, 14, 15, 48, 60, 93, 96, 98, 99, 101, 102, 103, 104, 105, 106, 107, 108, 109, 110, 111 |
| 4 | 1, 2, 3, 4, 5, 6, 7, 8, 9, 10, 11, 12, 13, 15, 48, 60, 93, 96, 98, 99, 101, 102, 103, 104, 105, 106, 107, 108, 109, 110, 111 |
| 5 | 1, 2, 3, 4, 5, 6, 7, 8, 10, 11, 12, 14, 15, 42, 45, 57, 66, 93, 96, 98, 99, 101, 102, 104, 105, 106, 107, 108, 109, 110, 111 |
| 6 | 1, 2, 3, 4, 5, 6, 7, 8, 10, 11, 12, 13, 15, 42, 45, 57, 66, 93, 96, 98, 99, 101, 102, 104, 105, 106, 107, 108, 109, 110, 111 |
| 7 | 1, 2, 3, 4, 7, 8, 9, 15, 21, 27, 33, 39, 45, 51, 57, 63, 69, 75, 81, 87, 93, 96, 99, 101, 102, 104, 105, 108, 109, 110, 111 |
| 8 | 1, 2, 3, 4, 5, 6, 7, 8, 11, 12, 14, 15, 24, 36, 48, 60, 72, 84, 93, 96, 99, 101, 102, 104, 105, 106, 107, 108, 109, 110, 111 |
| 9 | 1, 2, 3, 4, 5, 6, 7, 8, 11, 12, 13, 15, 24, 36, 48, 60, 72, 84, 93, 96, 99, 101, 102, 104, 105, 106, 107, 108, 109, 110, 111 |
| 10 | 1, 2, 3, 4, 5, 6, 7, 8, 11, 12, 14, 15, 27, 39, 51, 63, 75, 87, 93, 96, 99, 101, 102, 104, 105, 106, 107, 108, 109, 110, 111 |
| 11 | 1, 2, 3, 4, 5, 6, 7, 8, 11, 12, 13, 15, 27, 39, 51, 63, 75, 87, 93, 96, 99, 101, 102, 104, 105, 106, 107, 108, 109, 110, 111 |
| 12 | 1, 2, 3, 4, 5, 6, 7, 8, 10, 11, 12, 14, 15, 45, 48, 57, 63, 93, 96, 98, 99, 101, 102, 104, 105, 106, 107, 108, 109, 110, 111 |
| 13 | 1, 2, 3, 4, 5, 6, 7, 8, 10, 11, 12, 13, 15, 45, 48, 57, 63, 93, 96, 98, 99, 101, 102, 104, 105, 106, 107, 108, 109, 110, 111 |
| 14 | 1, 2, 3, 4, 5, 6, 7, 8, 11, 12, 14, 15, 24, 36, 48, 54, 60, 72, 84, 96, 99, 101, 102, 104, 105, 106, 107, 108, 109, 110, 111 |
| 15 | 1, 2, 3, 4, 5, 6, 7, 8, 11, 12, 13, 15, 24, 36, 48, 54, 60, 72, 84, 96, 99, 101, 102, 104, 105, 106, 107, 108, 109, 110, 111 |
| 16 | 1, 2, 3, 4, 5, 6, 7, 8, 10, 11, 12, 14, 15, 45, 48, 51, 57, 63, 93, 96, 99, 101, 102, 104, 105, 106, 107, 108, 109, 110, 111 |

FIG 12B

| | |
|---|---|
| 17 | 1, 2, 3, 4, 5, 6, 7, 8, 10, 11, 12, 13, 15, 45, 48, 51, 57, 63, 93, 96, 99, 101, 102, 104, 105, 106, 107, 108, 109, 110, 111 |
| 18 | 1, 2, 3, 4, 5, 6, 7, 8, 12, 13, 15, 24, 36, 48, 54, 57, 60, 72, 84, 96, 99, 101, 102, 104, 105, 106, 107, 108, 109, 110, 111 |
| 19 | 1, 2, 3, 4, 5, 6, 7, 8, 12, 14, 15, 24, 36, 42, 48, 54, 57, 60, 72, 96, 99, 101, 102, 104, 105, 106, 107, 108, 109, 110, 111 |
| 20 | 1, 2, 3, 4, 5, 6, 7, 8, 12, 13, 15, 24, 36, 42, 48, 54, 57, 60, 72, 96, 99, 101, 102, 104, 105, 106, 107, 108, 109, 110, 111 |
| 21 | 1, 2, 3, 4, 5, 6, 7, 8, 12, 14, 15, 36, 42, 45, 48, 54, 57, 60, 72, 96, 99, 101, 102, 104, 105, 106, 107, 108, 109, 110, 111 |
| 22 | 1, 2, 3, 4, 5, 6, 7, 8, 12, 13, 15, 36, 42, 45, 48, 54, 57, 60, 72, 96, 99, 101, 102, 104, 105, 106, 107, 108, 109, 110, 111 |
| 23 | 1, 2, 3, 4, 5, 6, 7, 8, 12, 13, 15, 36, 42, 48, 51, 57, 60, 66, 72, 96, 99, 101, 102, 104, 105, 106, 107, 108, 109, 110, 111 |
| 24 | 1, 2, 3, 4, 5, 6, 7, 8, 12, 13, 15, 24, 36, 48, 54, 57, 60, 66, 72, 96, 99, 101, 102, 104, 105, 106, 107, 108, 109, 110, 111 |
| 25 | 1, 2, 3, 4, 5, 6, 7, 8, 12, 14, 15, 24, 48, 54, 57, 60, 63, 66, 72, 96, 99, 101, 102, 104, 105, 106, 107, 108, 109, 110, 111 |
| 26 | 1, 2, 3, 4, 5, 6, 7, 8, 12, 13, 15, 24, 48, 54, 57, 60, 63, 66, 72, 96, 99, 101, 102, 104, 105, 106, 107, 108, 109, 110, 111 |
| 27 | 1, 2, 3, 4, 5, 6, 7, 8, 13, 15, 24, 36, 42, 48, 51, 57, 60, 66, 72, 92, 96, 99, 101, 102, 104, 105, 107, 108, 109, 110, 111 |
| 28 | 1, 2, 3, 4, 5, 6, 7, 8, 12, 13, 15, 24, 42, 48, 54, 57, 60, 66, 69, 96, 99, 101, 102, 104, 105, 106, 107, 108, 109, 110, 111 |
| 29 | 1, 2, 3, 4, 5, 6, 7, 8, 9, 10, 11, 12, 14, 15, 24, 92, 93, 96, 98, 99, 101, 102, 103, 104, 105, 106, 107, 108, 109, 110, 111 |
| 30 | 1, 2, 3, 4, 5, 6, 7, 8, 9, 10, 11, 12, 13, 15, 24, 92, 93, 96, 98, 99, 101, 102, 103, 104, 105, 106, 107, 108, 109, 110, 111 |
| 31 | 1, 2, 3, 4, 5, 6, 7, 8, 10, 11, 12, 14, 15, 45, 48, 57, 66, 93, 96, 98, 99, 101, 102, 104, 105, 106, 107, 108, 109, 110, 111 |
| 32 | 1, 2, 3, 4, 5, 6, 7, 8, 10, 11, 12, 13, 15, 45, 48, 57, 66, 93, 96, 98, 99, 101, 102, 104, 105, 106, 107, 108, 109, 110, 111 |
| 33 | 1, 2, 3, 4, 5, 6, 7, 8, 12, 14, 15, 24, 42, 48, 54, 57, 60, 66, 69, 96, 99, 101, 102, 104, 105, 106, 107, 108, 109, 110, 111 |

FIG 13

| Repetition of 8 bits (32 to 40 bits), =1/2 | |
|---|---|
| Pattern | Bits to be repeated |
| 1 | 17, 19, 21, 23, 25, 27, 29, 31 |
| 2 | 13, 14, 15, 16, 17, 18, 19, 20 |
| 3 | 18, 20, 22, 24, 26, 28, 30, 32 |
| 2 | 16, 18, 20, 22, 24, 26, 28, 30 |

FIG 14

| Repetition of 6 bits (74 to 80 bits), R=1/2 | |
|---|---|
| Pattern | Bits to be repeated |
| 1 | 35, 36, 37, 38, 39, 40 |
| 2 | 32, 34, 36, 38, 40, 42 |
| 3 | 26, 30, 34, 38, 42, 44 |
| 4 | 20, 28, 36, 44, 52, 60 |

FIG 15

| Repetition of 4 bits (36 to 40 bits), R=1/2 | |
|---|---|
| Pattern | Bits to be repeated |
| 1 | 16, 18, 20, 22 |
| 2 | 14, 18, 20, 22 |

FIG 16

| Repetition of 14 bits (54 to 40 bits), R=1/3 | |
|---|---|
| Pattern | Bits to be repeated |
| 1 | 1, 2, 3, 4, 7, 8, 39, 42, 45, 48, 51, 52, 53, 54 |
| 2 | 1, 2, 3, 4, 6, 7, 8, 39, 42, 48, 51, 52, 53, 54 |
| 3 | 1, 2, 3, 4, 7, 8, 36, 39, 42, 48, 51, 52, 53, 54 |
| 4 | 1, 2, 3, 4, 6, 7, 8, 39, 45, 48, 51, 52, 53, 54 |

| Additional puncturing pattern from 111 to 80 bits, R=1/3 | /3 |
| --- | --- |
| Pattern | Bits to be punctured |
| 34 | 1, 2, 3, 4, 5, 6, 7, 8, 12, 13, 15, 24, 39, 44, 49, 54, 59, 64, 69 92, 96, 99,101,102,104,106,107,108,109,110,111 |
| 35 | 1, 2, 3, 4, 5, 6, 7, 8, 12, 13, 15, 24, 42, 47, 52, 57, 62, 67, 72, 92, 96, 99,101,102,104,106,107,108,109,110,111 |
| 36 | 1, 2, 3, 4, 5, 6, 7, 8, 12, 13, 15, 24, 42, 44, 49, 54, 59, 64, 69 92, 96, 99,101,102,104,106,107,108,109,110,111 |
| 37 | 1, 2, 3, 4, 5, 6, 7, 8, 12, 13, 15, 24, 39, 43, 47, 57, 61, 65, 69, 92, 96, 99,101,102,104,106,107,108,109,110,111 |
| 38 | 1, 2, 3, 4, 5, 6, 7, 8, 12, 13, 15, 39, 42, 44, 49, 54, 59, 64, 69 92, 96, 99,101,102,104,106,107,108,109,110,111 |
| 39 | 1, 2, 3, 4, 5, 6, 7, 8, 12, 13, 15, 36, 39, 44, 49, 54, 59, 64, 69 92, 96, 99,101,102,104,106,107,108,109,110,111 |
| 40 | 1, 2, 3, 4, 5, 7, 8, 13, 15, 24, 30, 35, 40, 45, 50, 55, 60, 68, 70, 75, 83, 96, 99,101,102,104,106,108,109,110,111 |
| 41 | 1, 2, 3, 4, 5, 6, 7, 8, 12, 13, 15, 24, 39, 45, 51, 57, 63, 69, 75, 92, 96, 99,101,102,104,106,107,108,109,110,111 |
| 42 | 1, 2, 3, 4, 5, 7, 8, 12, 13, 15, 24, 36, 41, 46, 51, 56, 61, 66, 71, 76, 92, 96, 99,101,102,104,106,108,109,110,111 |

Fig.17

| Puncturing from 108 to 80 bits, R=1/3 | |
|---|---|
| Pattern | Bits to be punctured |
| 1 | 1, 2, 3, 4, 5, 6, 7, 8, 12, 13, 15, 24, 48, 54, 57, 63, 66, 69, 72, 75, 93, 96, 98, 99,101,102,103,104,105,106,107,108 |

Fig.18

Puncturing pattern 114->80, R=1/3

| Puncturing from 114 to 80 bits, R=1/3 | |
|---|---|
| Pattern | Bits to be punctured |
| 1 | 1, 2, 3, 4, 5, 6, 7, 8, 12, 13, 15, 24, 42, 45, 48, 54, 57, 60, 66, 69, 72, 75, 99,102,104,105,107,108,109,110,111,112,113,114 |
| 2 | 1, 2, 3, 4, 5, 6, 7, 8, 12, 13, 15, 24, 42, 48, 54, 57, 60, 66, 69, 72, 96, 99,102,104,105,107,108,109,110,111,112,113,114 |
| 3 | 1, 2, 3, 4, 5, 6, 7, 8, 10, 12, 13, 15, 21, 24, 48,54,57,60,63, 66, 96, 97, 99,102,104,105,107,108,109,110,111,112,113,114 |
| 4 | 1, 2, 3, 4, 5, 6, 7, 8, 12, 13, 15, 24, 42, 48, 54, 57, 60, 66, 69, 72, 75, 96, 99,102,104,105,107,108,109,110,111,112,113,114 |
| 5 | 1, 2, 3, 4, 5, 6, 7, 8, 12, 13, 15, 24, 42, 45, 48, 54, 57, 60, 66, 69, 72, 75, 96, 99,102,104,105,107,108, 110,111,112,113,114 |
| 6 | 1, 2, 3, 4, 5, 6, 7, 8, 11, 12, 13, 15, 24, 42, 48, 54, 57, 60, 66, 69, 72, 75, 96, 99,102,104,105,107,108,110,111,112,113,114 |
| 7 | 1, 2, 3, 4, 5, 6, 7, 8, 10, 12, 13, 15, 24, 48, 54, 57, 60, 66, 69, 96, 99,101,102,104,105,107,108,109,110,111,112,113,114 |

Fig.19

Puncturing pattern 117 -> 80, R=1/3

| Puncturing pattern from 117 to 80 bits, R = 1/3 ||
| Pattern | Bits to be punctured |
|---|---|
| 1 | 1, 2, 3, 4, 5, 6, 7, 8, 12, 13, 15, 24, 36, 40, 44, 48, 52, 56, 60, 64, 68, 72, 76, 80, 84, 98,102,105,107,108,110,112,113,114,115,116,117 |
| 2 | 1, 2, 3, 4, 5, 6, 7, 8, 12, 13, 15, 24, 39, 40, 44, 48, 52, 56, 60, 64, 68, 72, 76, 80, 84, 98,102,105,107,108,110,112,113,114,115,116,117 |
| 3 | 1, 2, 3, 4, 5, 6, 7, 8, 12, 13, 15, 24, 39, 40, 44, 51, 52, 56, 63, 64, 68, 75, 76, 80, 87, 98,102,105,107,108,110,112,113,114,115,116,117 |
| 4 | 1, 2, 3, 4, 5, 6, 7, 8, 12, 13, 15, 24, 39, 43, 47, 51, 55, 59, 63, 67, 71, 75, 79, 83, 87, 98,102,105,107,108,110,112,113,114,115,116,117 |
| 5 | 1, 2, 3, 4, 5, 7, 8, 9, 12, 13. 18, 23, 28, 33, 38, 43, 48, 53, 58, 63, 68, 73, 78, 83, 88, 93, 98, 105,106,109,110,111,113,114,115,116,117 |
| 6 | 1, 2, 3, 4, 5, 6, 7, 8, 12, 13, 15, 24, 40, 43, 46, 49, 55, 61, 64, 67, 70, 73, 76, 79, 82, 98,102,105,107,108,110,112,113,114,115,116,117 |
| 7 | 1, 2, 3, 4, 5, 7, 8, 12, 13, 15, 20, 24, 36, 40, 44, 48, 52, 56, 60, 64, 68, 72, 76, 80, 84, 87 98,102,105,107,108,110,112,114,115,116,117 |
| 8 | 1, 2, 3, 4, 5, 7, 8, 12, 13, 15, 24, 32, 36, 40, 44, 48, 52, 56, 60, 64, 68, 72, 76, 80, 84, 86 98,102,105,107,108,110,112,114,115,116,117 |
| 9 | 1, 2, 3, 4, 5, 6, 7, 8, 12, 13, 15, 24, 42, 45, 48, 51, 54, 57, 60, 63, 66, 69, 72, 75, 78, 98,102,105,107,108,110,112,113,114,115,116,117 |
| 10 | 1, 2, 3, 4, 5, 6, 7, 8, 12, 13, 15, 24, 39, 42, 45, 48, 54, 60, 63, 66, 69, 72, 75, 78, 81, |

Fig. 20

|    |                                                                                                                                                                                                   |
|----|---------------------------------------------------------------------------------------------------------------------------------------------------------------------------------------------------|
|    | 98,102,105,107,108,110,112,113,114,115,116,117                                                                                                                                                    |
| 11 | 1, 2, 3, 4, 5, 6, 7, 8, 12, 13, 15, 24, 39, 42, 45, 48, 51, 54, 57, 60, 69, 75, 78, 81, 84, 98,102,105,107,108,110,112,113,114,115,116,117                                                         |
| 12 | 1, 2, 3, 4, 5, 6, 7, 8, 12, 13, 15, 24, 42, 45, 48,54,57,60, 63, 66, 69, 72, 75, 78, 81, 102,105,107,108,110,111,112,113,114,115,116,117                                                           |
| 13 | 1, 2, 3, 4, 5, 6, 7, 8, 12, 13, 15, 24, 39, 42, 45, 48, 54, 60, 63, 66, 69, 72, 75, 78, 81, 84 102,105,107,108,110,112,113,114,115,116,117                                                         |
| 14 | 1, 2, 3, 4, 5, 6, 7, 8, 12, 13, 15, 24, 39, 42, 45, 48, 54, 60, 63, 66, 69, 72, 75, 78, 81, 99,102,105,107,108,110,111,113,114,115,116,117                                                         |
| 15 | 1, 2, 3, 4, 5, 6, 7, 8, 12, 13, 15, 24, 36, 42, 45, 48, 54, 60, 63, 66, 69, 72, 75, 78, 81, 98,102,105,107,108,110,112,113,114,115,116,117                                                         |

Fig. 20A

*Puncturing pattern 52 -> 40, R=1/2*

| Puncturing from 52 to 40 bits, R = 1/2 | |
|---|---|
| Pattern | Bits to be punctured |
| 1 | 1, 2, 3, 4, 5, 43, 45, 47, 49, 50, 51, 52 |
| 2 | 1, 2, 3, 4, 5, 45, 47, 48, 49, 50, 51, 52 |
| 3 | 1, 2, 3, 4, 15, 25, 45, 47, 49, 50, 51, 52 |
| 4 | 1, 2, 3, 4, 5, 43, 47, 48, 49, 50, 51, 52 |
| 5 | 1, 2, 3, 4, 5, 43, 45, 48, 49, 50, 51, 52 |
| 6 | 1, 2, 3, 4, 5, 25, 45, 47, 48, 49, 51, 52 |
| 7 | 1, 2, 3, 4, 5, 25, 43, 47, 48, 49, 51, 52 |
| 8 | 1, 2, 3, 4, 5, 43, 45, 47, 48, 49, 51, 52 |
| 9 | 1, 2, 3, 4, 15, 43, 45, 47, 48, 49, 51, 52 |

Fig.21

*Puncturing pattern 46 -> 40, R=1/2*

| Puncturing from 46 to 40 bits, R = 1/2 | |
|---|---|
| Pattern | Bits to be punctured |
| 1 | 1, 3, 39, 41, 45, 46 |
| 2 | 1, 3, 39, 41, 43, 46 |
| 3 | 1, 3, 39, 43, 45, 46 |
| 4 | 1, 2, 3, 43, 45, 46 |
| 5 | 1, 2, 39, 41, 45, 46 |
| 6 | 1, 2, 3, 39, 43, 46 |

Fig.22

Puncturing pattern 54 -> 40, R=1/3

| Puncturing from 54 to 40 bits, R=1/3 | |
|---|---|
| Pattern | Bits to be punctured |
| 1 | 1, 2, 3, 4, 6, 7, 8, 39, 42, 48, 51, 52, 53, 54 |
| 2 | 1, 2, 3, 4, 6, 7, 8, 39, 45, 48, 51, 52, 53, 54 |
| 3 | 1, 2, 3, 4, 7, 8, 39, 42, 45, 48, 51, 52, 53, 54 |
| 4 | 1, 2, 3, 4, 7, 8, 13, 39, 45, 48, 51, 52, 53, 54 |
| 5 | 1, 2, 3, 4, 7, 8, 36, 39, 42, 48, 51, 52, 53, 54 |

Fig.23

Puncturing pattern 56 -> 40, R= 1/2

| Puncturing from 56 to 40 bits, R = 1/2 | |
|---|---|
| Pattern | Bits to be punctured |
| 1 | 1, 2, 3, 4, 5, 6, 7, 45, 47, 49, 51, 52, 53, 54, 55, 56 |
| 2 | 1, 2, 3, 4, 5, 6, 15, 45, 47, 49, 51, 52, 53, 54, 55, 56 |
| 3 | 1, 2, 3, 4, 5, 15, 21, 29, 47, 49, 51, 52, 53, 54, 55, 56 |

Fig.24

Repetition pattern 36 -> 40 bits, R=1/2

| Repetition of 36 to 40 bits, R=1/2 | |
|---|---|
| Pattern | Bits to be repeated |
| 1 | 14, 18, 20, 22 |
| 2 | 16, 18, 20, 22 |
| 3 | 14, 17, 10, 23 |
| 4 | 10, 15, 20, 25 |
| 5 | 13, 16, 19, 22 |

Fig. 25

| Puncturing of 48 to 40 bits | |
|---|---|
| Pattern | Bits to be punctured |
| 1 | 1, 8, 15, 22, 28, 35, 42, 48 |
| 2 | 1, 2, 10, 18, 25, 33, 41, 48 |
| 3 | 1, 2, 3, 12, 21, 30, 39, 48 |
| 4 | 1, 2, 3, 4, 15, 26, 37, 48 |
| 5 | 1, 2, 3, 4, 5, 20, 34, 48 |
| 6 | 1, 2, 3, 4, 5, 6, 27, 48 |

Fig. 26

| Figure 27: Puncturing of 111 to 80 bits | |
|---|---|
| Pattern | Bits to be punctured |
| 1 | 1, 5, 8, 11, 14, 17, 20, 23, 26, 29, 32, 35, 38, 41, 44, 47, 50, 53, 56, 60, 63, 66, 69, 72, 75, 78, 81, 84, 87, 90, 93, 96, 99,102,105,108,111 |
| 2 | 1, 2, 6, 9, 12, 15, 18, 21, 24, 27, 31, 34, 37, 40, 43, 46, 49, 52, 55, 59, 62, 65, 68, 71, 74, 77, 80, 83, 87, 90, 93, 96, 99,102,105,108,111 |
| 3 | 1, 2, 3, 7, 10, 13, 16, 19, 23, 26, 29, 32, 35, 38, 42, 45, 48, 51, 54, 57, 61, 64, 67, 70, 73, 77, 80, 83, 86, 89, 92, 96, 99,102,105,108,111 |
| 4 | 1, 2, 3, 4, 8, 11, 14, 17, 21, 24, 27, 30, 34, 37, 40, 43, 47, 50, 53, 56, 60, 63, 66, 69, 73, 76, 79, 82, 86, 89, 92, 95, 99,102,105,108,111 |
| 5 | 1, 2, 3, 4, 5, 9, 12, 15, 19, 22, 25, 29, 32, 35, 39, 42, 45, 49, 52, 55, 58, 62, 65, 68, 72, 75, 78, 82, 85, 88, 92, 95, 98,102,105,108,111 |
| 6 | 1, 2, 3, 4, 5, 6, 10, 13, 17, 20, 23, 27, 30, 34, 37, 40, 44, 47, 51, 54, 57, 61, 64, 67, 71, 74, 78, 81, 84, 88, 91, 95, 98,101,105,108,111 |
| 7 | 1, 2, 3, 4, 5, 6, 7, 11, 14, 18, 21, 25, 28, 32, 35, 39, 42, 46, 49, 53, 56, 59, 63, 66, 70, 73, 77, 80, 84, 87, 91, 94, 98,101,105,108,111 |
| 8 | 1, 2, 3, 4, 5, 6, 7, 8, 12, 16, 19, 23, 26, 30, 33, 37, 40, 44, 48, 51, 55, 58, 62, 65, 69, 72, 76, 80, 83, 87, 90, 94, 97,101,104,108,111 |
| 9 | 1, 2, 3, 4, 5, 6, 7, 8, 9, 13, 17, 20, 24, 28, 31, 35, 39, 42, 46, 50, 53, 57, 60, 64, 68, 71, 75, 79, 82, 86, 90, 93, 97,101,104,108,111 |
| 10 | 1, 2, 3, 4, 5, 6, 7, 8, 9, 10, 14, 18, 22, 25, 29, 33, 37, 40, 44, 48, 52, 55, 59, 63, 67, 70, 74, 78, 82, 85, 89, 93, 97,100,104,108,111 |
| 11 | 1, 2, 3, 4, 5, 6, 7, 8, 9, 10, 11, 15, 19, 23, 27, 31, 35, 38, 42, 46, 50, 54, 58, 61, 65, 69, 73, 77, 81, 85, 88, 92, 96,100,104,108,111 |

```
if puncturing is to be performed
    e = e_ini                         -- initial error between current and desired puncturing ratio
    m = 1                             -- index of current bit
    do while m <= X_i
        e = e - e_minus               -- update error
        if e <= 0 then                -- check if bit number m should be punctured
            set bit x_{i,m} to δ where δε{0, 1}
            e = e + e_plus             -- update error
        end if
        m = m + 1                      -- next bit
    end do
else
    e = e_ini                         -- initial error between current and desired puncturing ratio
    m = 1                             -- index of current bit
    do while m <= X_i
        e = e - e_minus               -- update error
        do while e <= 0               -- check if bit number m should be repeated
            repeat bit x_{i,m}
            e = e + e_plus             -- update error
        end do
        m = m + 1                      -- next bit
    end do
end if
```

Fig. 28

METHOD AND COMMUNICATIONS DEVICE FOR ADAPTING THE DATA TRANSFER RATE IN A COMMUNICATIONS DEVICE

BACKGROUND OF THE INVENTION

Different applications in communications systems mostly operate with different data rates. But the underlying transmission channels, however, mostly offer, because they are embedded into certain transmission formats, only a fixed data transmission rate or a raw data transmission rate or only a discrete set of such data rates. Thus, it will be necessary, in general, to match the data rates to each other at the corresponding interface. This is described below using an example from the UMTS standardization.

At present, work is in progress on standardizing what is known as the UMTS (Universal Mobile Telecommunications System) mobile radio standard for third-generation mobile radio devices. In accordance with the known current state of UMTS standardization there is provision for subjecting the data to be transferred via a high frequency channel to channel coding, in which case convolutional codes are particularly used. The data to be transmitted is coded redundantly by channel coding which makes a more reliable retrieval of the transmitted data possible on the receiver side. The code used in each case for channel coding is characterized by its code rate r=k/n, where k is the number of data bits or message bits to be transmitted and n is the number of the bits present after encoding. As a rule, the smaller the code rate the more powerful the coding. A problem associated with coding, however, is that the data rate is reduced by a factor of r.

Rate matching is performed in the transmitter to adapt the data rate of the coded data stream to the relevant possible transmission rate with bits being either removed from the data stream in accordance with a specific pattern or duplicated in the data stream. The removal of bits is the called "puncturing" and the duplication is called "repetition".

According to the current status of UMTS standardization, it is proposed for rate matching that an algorithm be used which performs puncturing with an almost regular puncturing pattern, with the bits to be punctured being distributed equidistantly over the coded data block to be punctured in each case.

In addition, it is known that for convolutional coding the bit error rate (BER) decreases at the edge of a correspondingly coded data block. It is also known that the bit error rate within a data block can be changed locally by regularly distributed puncturing. It is further known from WO 01/26273A1 and WO 01/39421 A1 that it is advantageous to puncture the individual data blocks of the data stream for adapting the data rate in accordance with a specific puncturing pattern, in which case the puncturing pattern is designed in such a way that it features a puncturing rate that increases constantly from a middle area of the individual data block to at least one end of the individual data block.

An object of the present invention is, thus, to specify a method for adapting the data rate of a data stream in a communications device as well as a corresponding communications device which guarantees a satisfactory bit error rate and can be used, in particular, in mobile radio systems with convolutional coding.

SUMMARY OF THE INVENTION

In this case, the methodology of convolutional codes will be used to find heuristic puncturing patterns after the use of which all bits of the punctured data block possess a bit error rate corresponding to their relevant importance.

Preferably, the puncturing pattern features a puncturing rate which increases from the middle area to both ends of the relevant data block. In this way, the bits at the start and the end of the data block to be punctured in each case are punctured more heavily where this is done, not with an evenly-distributed puncturing rate, but with any puncturing rate which essentially increases towards both ends of the data block; i.e., the gap between the punctured bits is on average ever shorter towards both ends of the data block. As will be shown below, the puncturing rate surprisingly does not have to increase in a strictly monotonous way towards the ends, or expressed in other terms, the puncturing gap does not have to decrease strictly monotonously. Instead, because of the specific characteristics of the convolutional codes used and, in particular, the generator polynomials used, it can be an advantage to use somewhat more irregular patterns.

This puncturing leads to an evenly-distributed error rate of the individual bits over the punctured data block and, in addition, results in a reduced overall error probability.

The present invention is particularly suitable for adapting the data rate of a convolutional coded data stream and, thus, preferably can be used in UMTS mobile radio systems, in which case this relates both to the area of the mobile radio transmitter and to the mobile radio receiver. The present invention, however is not restricted to this area of application but can be used wherever the data rate of data stream is to be adapted.

Additional features and advantages of the present invention are described in, and will be apparent from, the following Detailed Description of the Invention and the Figures.

BRIEF DESCRIPTION OF THE FIGURES

FIG. 6 shows the bit error rate BER per bit for the rate matching proposed in UMTS (specification 25.21. v5.0.0, chap. 4.2.7 "Rate Matching") for HS-SCCH, Part 1, for a ratio of the energy of the transferred bits to the noise power density $E_3/N_0 = -3$ dB.

FIG. 7 shows how many input bits are involved for a puncturing of one output bit in the various output stages Output 1, Output 2 and output 3.

FIG. 8 shows which input bits (bit numbers) are affected by the puncturing.

FIG. 9 shows a table with the results of the puncturing depending on the number of punctured bits.

FIG. 10 shows the bit error rate BER per bit for a puncturing in accordance with an exemplary embodiment for HS-SCCH, Part 1, for a signal-to-noise ratio of the energy of the transferred bits for a noise power density of $E_3/N_0 = -3$ dB.

FIG. 11 shows different exemplary embodiments for a puncturing of 8 bits (48 to 40 bits) for an encoding with a rate ⅓.

FIG. 12 shows different exemplary embodiments for a puncturing of 31 bits (puncturing from 111 to 80 bits), R=⅓.

FIG. 13 shows different exemplary embodiments for a repetition of 31 bits (repetition from 32 to 40 bits) R=½.

FIG. 14 shows different exemplary embodiments for a repetition of 6 bits (74 to 80 bits), R=⅓.

FIG. 15 shows different exemplary embodiments for a repetition of 4 bits (36 to 40 bits), R=½.

FIG. 16 shows different exemplary embodiments for a repetition of 14 bits (54 to 40 bits), R=⅓.

FIG. 17 shows further exemplary embodiments for a puncturing of 31 bits (puncturing from 111 to 80 bits), R=⅓. This figure also can be viewed as a continuation of FIG. 12.

FIG. 18 shows an exemplary embodiment for a puncturing from 108 to 80 bits, R=⅓.

FIG. 19 shows exemplary embodiments for puncturing from 114 to 80 bits, R=⅓.

FIG. 20 shows exemplary embodiments for puncturing from 117 to 80 bits, R=⅓.

FIG. 21 shows exemplary embodiments for puncturing from 52 to 40 bits, R=½.

FIG. 22 shows exemplary embodiments for puncturing from 46 to 40 bits, R=½.

FIG. 23 shows exemplary embodiments for puncturing from 54 to 40 bits, R=⅓.

FIG. 24 shows exemplary embodiments for puncturing from 56 to 40 bits, R=½.

FIG. 25 shows exemplary embodiments for repetition from 36 to 40 bits, R=½.

FIG. 26 shows exemplary embodiments for puncturing from 48 to 40 bits.

FIG. 27 shows exemplary embodiments for puncturing from 11 to 40 bits.

FIG. 28 shows rate matching specifications from the 3 GPP Specification 25.211 v5.0.0, Chap. 4.2.7 Rate matching.

DETAILED DESCRIPTION OF THE INVENTION

In general, the rows in the table with all bold numbers refer to the relevant preferred exemplary embodiment, in which case however, the quality of the other exemplary embodiment does not necessarily differ in any major way from this high-lighted exemplary embodiment. In FIGS. 26 and 27, however, figures entered in bold indicate the bits punctured or repeated by the described construction principle of the rate matching formula in accordance with the present invention at the start or the end of the repetition pattern. These are defined such that, by contrast, the position of the bits not shown in bold type easily can be shifted by variation of the parameter or within the framework of the present invention (typically by one position).

Figure 1:
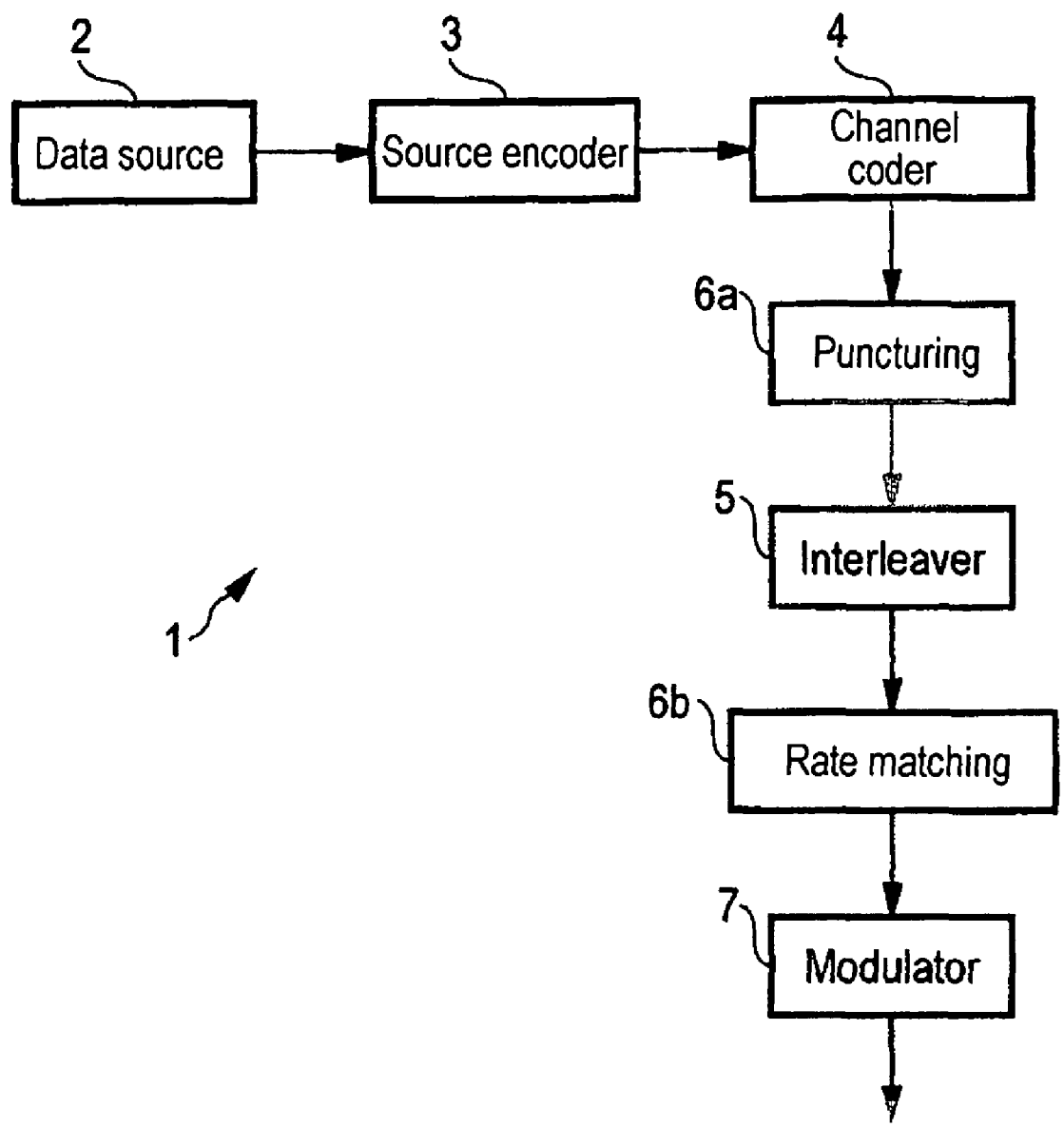
FIG. 1 shows a simplified block diagram of a mobile radio transmitter in accordance with the present invention.

FIG. 1 shows a schematic diagram of the structure of the mobile radio transmitter 1 in accordance with the present invention and from which data or communications information, especially voice information, will be transmitted via a high-frequency transmission channel to the receiver. In FIG. 1 the components involved in the coding of this information or data are shown, in particular. The information provided by a data source 2, such as a microphone, is initially converted with a digital source coder 3 into a bit stream. The voice-coded data is subsequently coded with the aid of a channel coder, in which case the actual payload or message bits are coded redundantly which allows transmission errors to be detected and subsequently corrected. The channel coder 4 can be a convolutional coder. The code rate produced for channel coding r is an important variable to describe the codes used in each case for channel coding and is, as has already been mentioned, defined by the expression r k/n. In this expression, the k stands for the number of data bits and n for the total number of bits coded; i.e., the number of inserted redundant bits corresponds to the expression n−k. A code with the code rate r defined above is also referred to as an (n,k) code, in which case the performance of the code increases with a decreasing code rate r. For channel coding, so-called block codes or convolutional codes are normally used.

The following explanations are based on the assumption—that, as defined in the current state of UMTS—standardization, convolutional codes are used for channel coding. A major difference to block codes is that with convolutional codes individual data blocks are not coded consecutively but that a continuous processing is involved, in which case each current code word of an input sequence also depends on the previous input sequence. Independently of the code rate r=k/n convolutional codes are also characterized by what is known as the constraint length K. The constraint length specifies over how many clock pulses of k new input bits of the channel coder 4 a bit influences the code word output by the channel coder 5.

Figure 5:
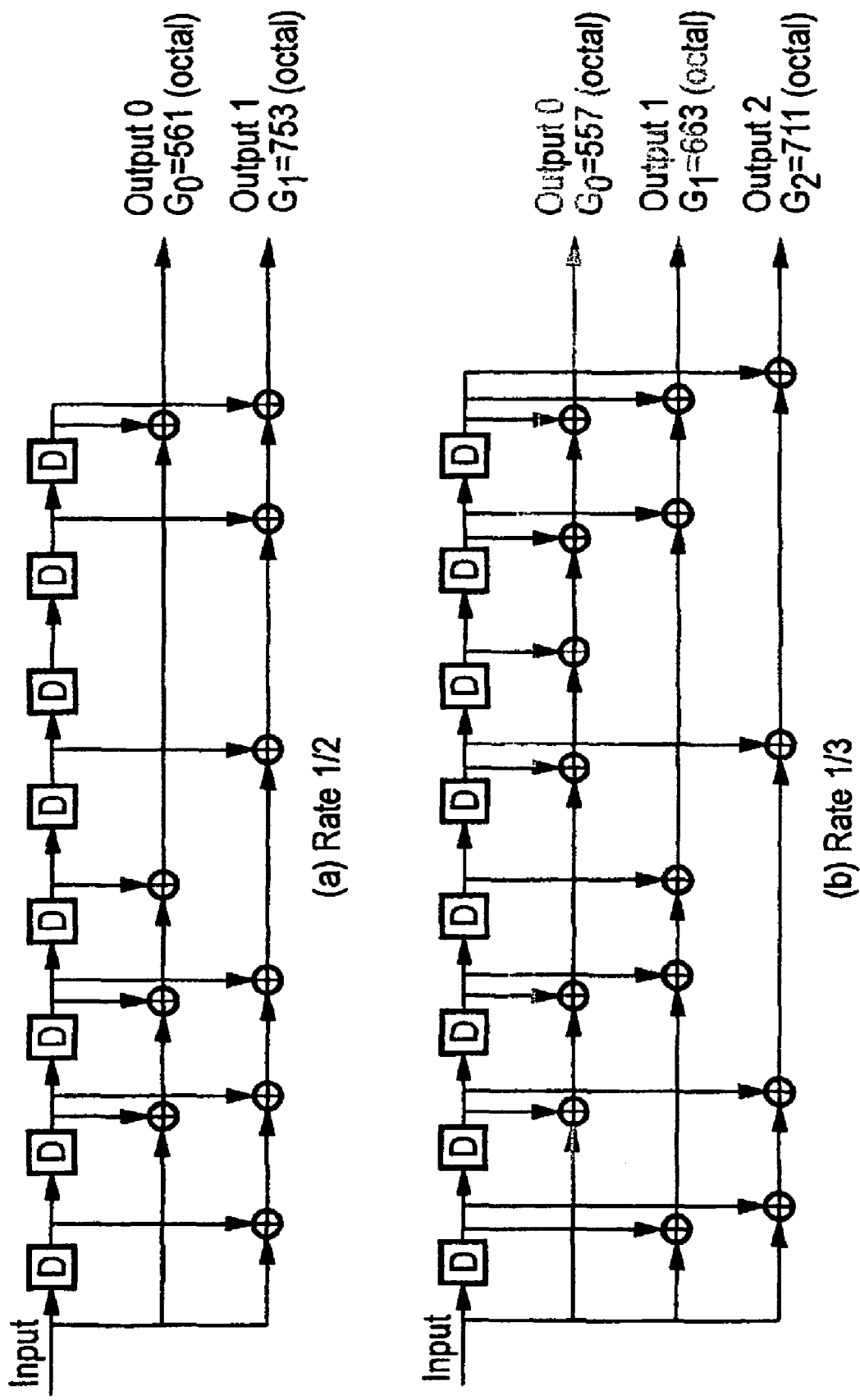
FIG. 5 shows underlying schemes for convolutional codes in UMTS

For UMTS, the following convolutional codes are used, as shown in FIG. 5. FIG. 5 is taken from specification 25.212, Chap. 4.2.3.1 "Convolutional coding."

Before transmission of the channel-coded information to the receiver, the information can be routed to an interleaver 5 which reorders the bits to be transmitted in accordance with a specific scheme and thereby spreads them over time, in which case the errors which as a rule occur in bundles are distributed in order to obtain what is known as a memoryless transmission channel with a quasi-random error distribution. The information or data coded in this way is routed to a Modulator 7 which has the task of modulating the data onto a carrier signal and of transmitting in accordance with a prespecified multiple access method via a high-frequency transmission channel 3 to a receiver.

For transmission, the coded data stream is subdivided into data blocks, in which case the channel coder 4 is set to a known status at the beginning of a data block. At the end, each coded data block is terminated by what are known as tail bits so that the channel coder 4 is again in a known state. The result of this convolutional code and channel code 4 structure is that the bits at the start and end of a coded data block are better protected from transmission errors than those in the middle of the block. In this case, it is of no significance whether these tail bits all have the known value of 0 or whether they have another value. Random values also can be chosen for these tail bits, in which case both transmitter and receiver must know the values to be used.

The error probability of a bit differs depending on its position within the relevant data block. This effect is exploited, for example, in voice transmission in GSM mobile systems by placing the most important bits of the block at both ends where the error probability is at its lowest. With data transmissions, however, data packets are already rejected if just one single transmitted bit is in error which can, for example, be established in the receiver by a "Cyclic Redundancy Check" (CRC). Thus, it is not possible to refer to important or less important data in a data transmission, all bits being regarded as equally important. If errors occur in a control block, that is a data block which contains control information which contains information about how subsequent payload data is to be encoded and transferred, then correct detection of this payload data is then no longer possible even if just a single bit is received incorrectly, since the received data is then interpreted incorrectly.

To match the data rate of the coded data stream to the relevant transmission rate possible, the rate matching is performed before the modulator 7. For the exemplary embodiment shown in FIG. 1, rate matching is undertaken in the rate matching unit 6b, in which case the puncturing unit 6a first undertakes puncturing in accordance with a specific puncturing pattern in order to achieve a more equal error distribution over a data block. The execution sequence of the puncturing unit 6a shown in FIG. 1 as well as of the interleaver are merely to be taken as examples. The interleaver also can be arranged after unit 6b. Likewise the interleaver 5 also can be replaced by two interleavers before and after the rate matching unit 6b etc.

The present invention further seeks to optimize puncturing patterns and match them to the polynomials used for the channel coder. There is also the task, depending on the convolution code used (including the polynomials used) and the block length, of selecting the quantity of bits to be punctured or repeated so that the decoding is undertaken as favorably as possible. As a rule, a large number of options are produced so it is at least very time and resource-consuming to develop a very good rate matching pattern purely through simulation. If, for example, one wishes to investigate all the options for puncturing of 48 bits to 40 bits this would be 48!/(8!*40)= 377348994 different options which could not be investigated within a reasonable time.

This problem is particularly evident for short block lengths such as, for example, for the control information of the UMTS expansion HSDPA and, in particular, the HS-SCCH (high speed shared control) channel. This cannel transmits configuration information which specifies how the actual payload data sent over the specific data channel is coded and further details, for example, the spread codes used for transmission. By contrast to the data channel over which a large amount of data can be transmitted, this is a comparatively small amount of data. In UMTS convolution codes with the rate ½ or ⅓ are used for coding, The polynomials used are shown in FIG. 5. Also referred to as polynomials are the exact design of the "tapping points" which delay stages are tapped for the individual output bit streams and logically combined by an exclusive OR operation.

The present invention is thus particularly applicable to what is known as the HS-SCCH (high speed shared control) channel.

The definition of the coding of the HS-SCCH is given in accordance with the current prior art in Specification 3GPP TS 25.1.212 V5.0.0 (2002-03) "Multiplexing and Channel Coding (FDD) (Release 5)," particularly in Chapter 4.6 "Coding for HS-SCCH." This specification is abbreviated elsewhere in this Patent Application to 25.212. Subsection 4.6.6 "Rate Matching for HS-SCCH" defines that rate matching must be performed in accordance with the standard rate matching algorithm in Chapter 4.2.7 "Rate Matching" which essentially effects an equidistant (as possible) puncturing or repetition.

The block length of the two parts of the HS-SCCH amounts in the current version to 8 bits for the first part, or if the tail bits are included, 16 bits, 29 bits for the second part, or if the tail bits are included, 37 bits. Since the specification is still fluid, modifications to various parameters or other block lengths can be produced. Furthermore, the convolution codes with the rate ½ or ⅓ also come into the picture. The following rate matchings are particularly relevant:

a) 32 to 40 (with code rate R=½), or
b) 48 to 40 (with code rate R=⅓), or
c) 74 to 80 (with code rate R=½), or
d) 111 to 80 (with code rate R=⅓).

Method for Determining Puncturing and Repetition Patterns

In overview, it can be stated that for a rate matching, a puncturing and/or repetition or also a repetition alone is undertaken so that the overall bit error rate (BER) becomes minimal. To this end, let us first look at the situation shown in FIG. 3. This records the bit error rate for the individual bits in a frame. The axis reflects the index or the relevant bit (frame index). One can clearly see that the first and last bits feature a lower bit error rate. This can be understood in conjunction with the scheme for con volution codes from FIG. 5, for transmission bits from the various delay stages D of the decoder are linked together by the convolution code in each case. The first bits are, for example, then linked with the bits preceding them, at bits which do not actually exist. These "non-existent bits" are then set to a known value, typically zero. This is known to the receiver which on its side now decodes with these bits set to zero the first bits transmitted. Decoding is very secure here since one part of the bits is known with absolute certainty.

The same is true for the last bits. These are again followed by artificial bits, known as the tail bits, into which the delay elements D of the decoder are inserted; these tail bits being set, in turn, to a known value (usually zero).

In the middle area, bits are linked together for which the value is not known with certainty at the receiver. As such, on decoding there is a greater probability of an error occurring, which expresses itself in a higher bit error rate.

The envelope curve of the bit error rate in relation to the frame number is thus initially deformed upwards in a convex shape for equal repetition or puncturing. There are now various options for how the envelope curve changes when the puncturing (or repetition) is changed.

a) The Envelope Essentially Represents a Horizontal (or Approximates to One)

This refers to the bit error rate being essentially the same for all bits within a frame. This occurs, for example, when there is puncturing at the edges or repetition in the middle, or both, depending on the rate to be matched.

b) Envelope Curve has a Concave Shape

In this case, for example, puncturing has been so heavy at the edge that the bits in the middle area of the frame exhibit a lower bit error rate. This situation can be seen in FIG. 2.

c) The Bit Error Rate is Irregularly Distributed in Relation to the Frame Number. This case is not examined in any more detail here for the reasons given below.

The information given below relates to puncturing. Similar considerations can be applied to repetition or for a combination of puncturing and repetition.

There are now very many options for how individual bits can be punctured. If, for example, one wishes, as already stated previously, to investigate all the possible options for puncturing 48 bits to 40 bits, this would be 48!/(8!*40!)= 377348994 different options, which cannot all be investigated within a reasonable time.

The aim, thus, is to eliminate non-viable options in advance. This is not done by random repetition and/or puncturing, which is why alternative c) will not be considered any further here.

An ordering principle is shown in FIG. 7. For the first 9 input bits 1-9 as well as for the last 9 input bits n-8 to n the puncturing level for the relevant output stage Output 0, Output 1, Output 2 is illustrated. The output stages themselves, as can be seen from FIG. 5, are the relevant output function which is formed from all input bits preceding the input bit currently under consideration in time. Here, the output stages of FIG. 5b are considered, that is the rate ⅓ convolutional encoder.

For puncturing with as little loss of information as possible, it makes sense to initially leave out bits (puncturing) which have little influence on other bits. The puncturing level thus specifies how many bits will be affected by puncturing of the bits concerned.

A typical methodology for leaving out or puncturing of bits is shown in FIG. 8. In the first column, the first 9 input bits 1-9 are again specified, as well as the last 9 input bits n-8 to n. In the following columns, the bit numbers of the information bits affected by puncturing, that is information bits or input bits for the relevant output stage output 0, output 1 and output 2 are shown. The table fields are, as already in FIG. 7, set against an increasingly darker background for an increasing number of information bits influenced. The bits belonging to the light table fields are thus candidates for puncturing.

FIG. 9 shows a table in which the most important variables for puncturing in the vicinity of the ends, that is puncturing of the first and last bits, are illustrated. n input bits (information bits) and k coded bits (bits at the output stage, output bits) are considered. In the first column, the number of punctured output bits (# punct bits) is specified. In the last column, the (cumulative) number of the bits affected by these bits at the input, in which case input bits which are affected a number of times, that is by the puncturing of a number of output bits, are also counted multiple times accordingly.

In the second column, Sequence specifies which output bit (bit number) has been punctured in this step. In this case, the puncturing takes place beginning with the least important bits in the first row through to the following bits in the following rows. The entire puncturing pattern for 7 bits to be punctured, for example, is thus produced from the bits specified in column 2 in rows 1 through 7; that is, bits 1, k, 4, k-4, k-6, 2, k-1. This pattern thus includes the bits 1, 2 4, k-6 k-4, k-1, k.

Above the first row is the indexing for the first information bits 1-9 as well as the last information bits k-8 through k. For reasons of space this is written as just −8, etc., instead of k-8. The entries in the columns under the indexing of the information bits specify how greatly the relevant information is affected by the puncturing of the output bits which are specified in the 2nd column up to the relevant row and are thus punctured. This refers to how many of the punctured output bits were linked to this information bit. This is a measure of how greatly the information bit involved was weakened by puncturing.

In the last column (cumulative), finally, the sum of these effects is given. It is called the cumulative puncturing strength in this case.

The column average value gives the ratio V of the sum of the last column divided by the number of information bits involved. For example, for 6 punctured bits V=(2+1+1+1+1)/ (1+1+1+1+1)=1.2. The average puncturing rate (av. puncturing rate) is the column "average value" divided by 18, the total number of exclusive OR operations occurring per information bit during encoding.

A procedure for puncturing any given number of bits includes preparing tables similar to the ones given above. The tables shown can be used for the rate ⅓ and the polynomials of the convolutional encoder considered. For other encoding rates and/or other polynomials the tables can be determined in a very similar way. With the aid of these tables a puncturing sequence is established in which first those output bits are punctured which have only a small effect on the cumulative puncturing strength. If there are a number of alternatives in these cases those bits which minimize the maximum of the puncturing strength of the individual bits are preferably punctured.

For a higher number of bits to be punctured and/or greater block lengths, as a rule the information from the tables must be combined with the idea of achieving as equal as possible a distribution over the entire block. It then makes sense to explicitly adopt additional bits in the middle part which are generated by the generator polynomials with the lowest powers; i.e., with the fewest logical combinations. At the same time it should be ensured that the overall distribution of the puncturing strengths in the middle area of the frame does not exhibit any obvious peaks.

The same applies to repeating, but with the reversed leading signs. As such, bits which were first punctured in accordance with the heuristic and even a repetition is first performed in the middle part, preferably by the polynomials of the most logical combinations. Afterwards, those bits are repeated at the edge which (for puncturing) have as great as possible an influence on the cumulative puncturing strength.

By contrast with methods in which the puncturing rate constantly increases up to the ends, this leads to a result which is not expected per se, since one would expect that the reliability of the coded bits constantly decreases towards the ends. A closer examination for the convolutional encoders used, however, shows that this assumption is surprisingly not true. The specific characteristics of the polynomials produce coded bits, particularly at the ends, which contribute less effectively to the coding. These bits, however, do not occur up to the end in constantly increasing volumes, but are somewhat irregularly distributed. By aligning the puncturing patterns specifically to these "weak" bits, that is by giving preference to puncturing these bits, one can improve the coding even further.

The present invention thus makes use of an heuristic method which allows:
- the effect of the puncturing/repeating of a coded bit on the underlying information bits to be approximated via a newly-defined heuristic metric;
- specific bits to be selected explicitly and for each convolution code which are to be punctured or repeated; and
- the number of the rate matching patterns to be investigated to be greatly restricted.

After a number of promising rate matching patterns have been determined based on this method, they will be compared on the basis of the frame error rate and the bit error rate of each individual information bit (referred to hereafter as the bit error rate distribution). The rate matching pattern then can be iteratively further refined and optimized, based on the developed metric. The bit error rate distribution of the non-punctured/non-repeated blocks serves as start information.

The puncturing strength $S_i$, per bit information bit i, will be defined as heuristic metric as the number of logical operations not transmitted by puncturing of one information bit with the relevant output bits of the encoder. $S_i$ is thus positive for puncturing. For repetition, $S_{i,k}=n-1$ is defined for each logical operation transmitted n times.

$S_{max}$ is the maximum possible puncturing strength specified by the code-specific total number of existing logical operations.

A good rate matching pattern is searched for in accordance with the following quality criterion:

1. select the cumulative puncturing strength to be close to the possible minimum;
2. ensure that there is as even as possible a distribution of the bit error rate across all information bits.

For the selection of the bits to be punctured/repeated, tables will be set up based on the generator polynomials of the codes for the start and the end of the coded blocks which represent the cumulative puncturing strength per coded bit as well as the information bits concerned. This allows the coded bits to be divided into what are known as classes of the cumulative puncturing strength.

In accordance with the above quality criterion, these tables are now used to search for bits to be punctured/repeated in such a way that, initially, for those information bits which exhibit a lower bit error rate than other bits, the puncturing strength is increased and simultaneously the cumulative puncturing strength is kept low. Thus, the puncturing strength will be selected to be inversely proportional to the bit error rate of the information bit and, in addition, bits will be explicitly sought which contribute little to the cumulative puncturing strength.

This method then will be applied iteratively, based on the first pattern determined, so that, even after just a few simulations, a specifically optimized rate matching pattern can be found for the relevant convolution code.

FIGS. 11 and 12 show different options for puncturing patterns in accordance with the present invention, in which case the number of bits to be punctured (counting begins at one) is specified in each case. The tables are specified for different numbers of information bits to be transmitted and different numbers of bits to be transmitted after the rate matching.

Figure 3:
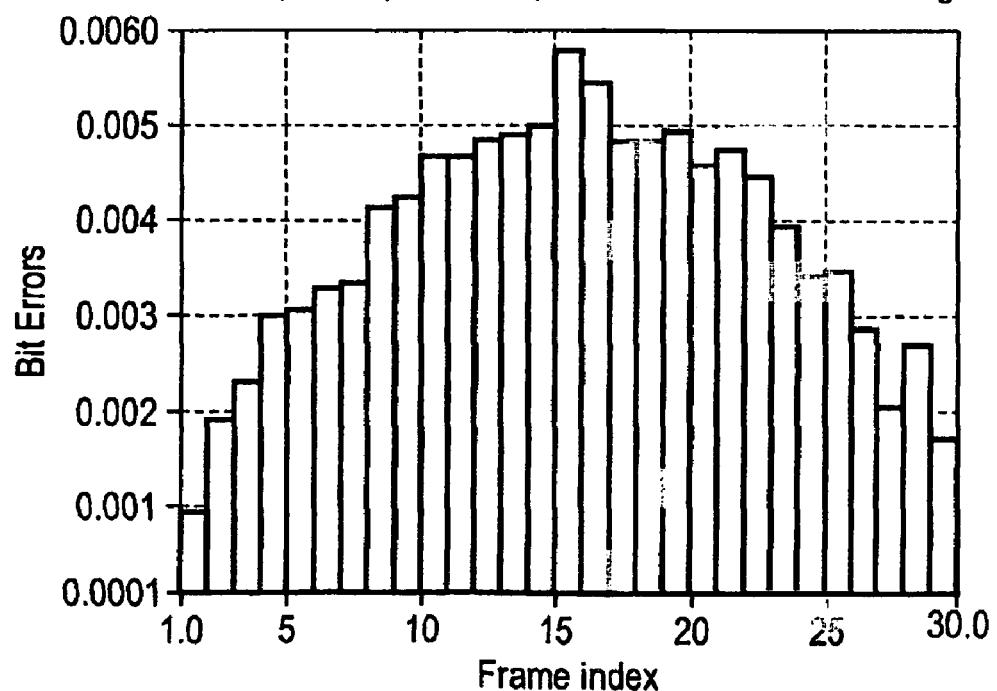
FIG. 3 shows the bit error rate BER per bit for the rate matching proposed in UMTS (Specification 25.21. v5.0.0, chap. 4.2.7 "Rate Matching") for HS-SCCH, Part 2, for a ratio of the energy of the transferred bits to the noise power density E3/N0=−2 dB.

FIG. 3 typically shows the graph of the bit error rate for the individual bits transmitted of a data block depending on their position or location in the data block for a conventional puncturing with a regular puncturing pattern.

Figure 2:
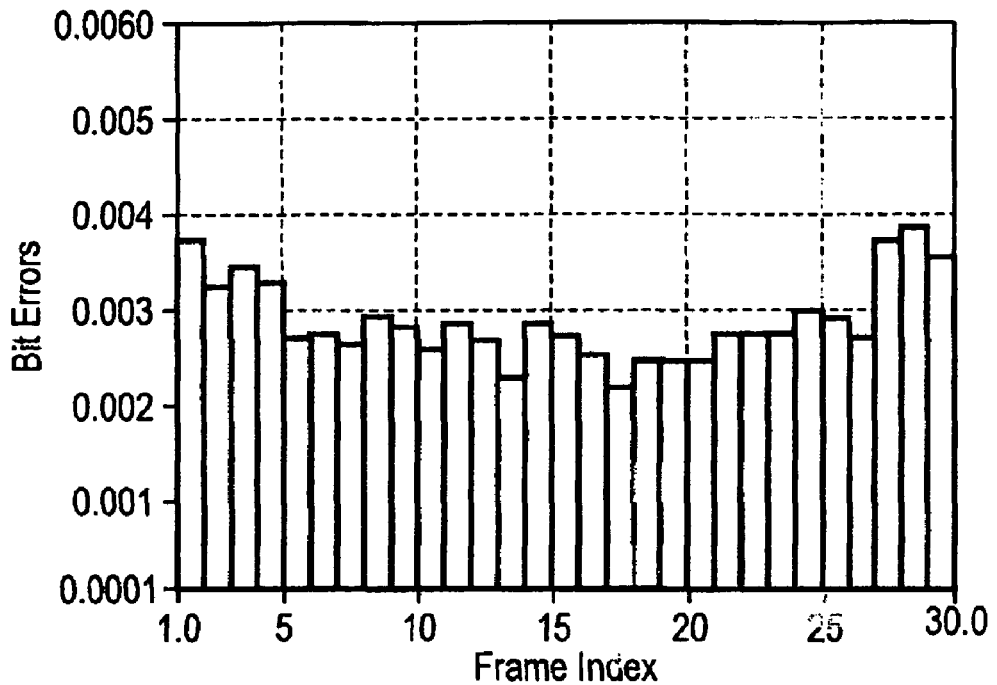
FIG. 2 shows the bit error rate BER per bit for puncturing in accordance with an exemplary embodiment at HS-SCCH, Part 2, coding with R=⅓ with a ratio of the energy of the transmitted bits to the noise power density E3/N0=−2 dB. The HS-SCCH channel stands for the high-speed shared control channel via which specific configuration information is transferred and which can the subdivided into two subareas, known as Part 1 and Part 2. Part 1 is transferred first in this case and contains the information which the mobile station requires first in order to process the following data channel. Part 2 contains that information which the mobile station does not need until later. What this division into two parts achieves is to make the delay through the HS-SCCH as small as possible since only the first part has to be decoded before data can begin to be received.

FIG. 2 shows this graph for puncturing in accordance with the present invention with pattern and number 33 from FIG. 12 which has shown itself to be particularly suitable in simulations. It can be seen from FIG. 2 that by using the puncturing pattern in accordance with the present invention a more even curve of the bit error rate over the entire data block can be achieved. Since, in the middle area of the data block, puncturing is less frequent compared to the conventional method, a lower error probability can be obtained there. Actually, the error rate now rises slightly towards the ends which could appear unfavourable at first glance. The result of this is, however, that there are many "weak" bits at the edge, as already stated above, where puncturing can be performed very effectively.

Figure 4:
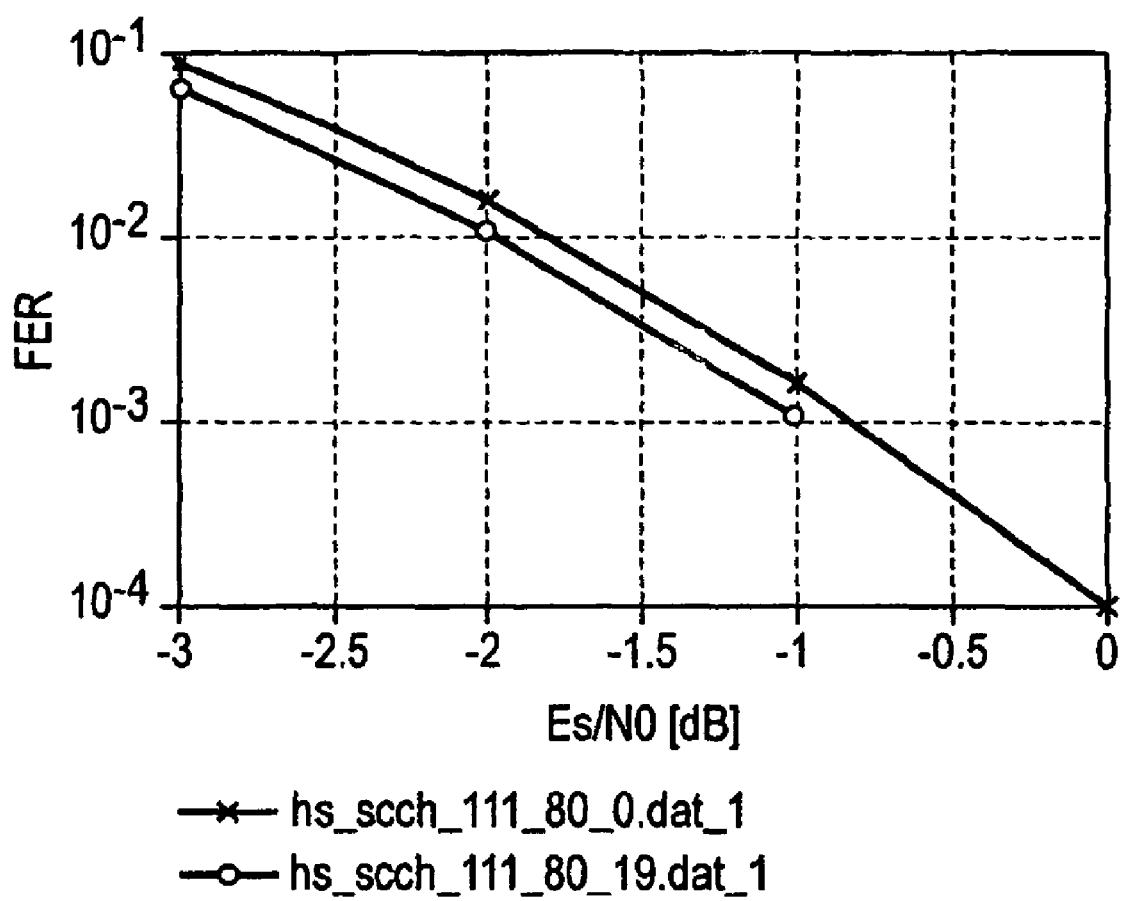
FIG. 4 shows a comparison of the results which can be achieved with puncturing in accordance with the present invention (upper curve, crosses) or a conventional puncturing (lower curve, circles) as regards the resulting overall error probability, where the diagram shows the probability that at least one bit of a block has been transmitted incorrectly (known as the frame error rate).

FIG. 4 records the curve of the overall error rate over the ratio of the energy of the transmitted bits to the noise power density for the same cases. It can be seen from FIG. 4 that with the aid of the present invention (lower curve, circles), compared to the conventional method (upper curve, crosses), a frame error rate improved by around 0.2 dB can be achieved.

Similar improvements also can be achieved for other parameters. For example, FIG. 6 shows the graph of the bit error rate for the individually transmitted bits of a data block depending on their position in the data block for a conventional puncturing with a regular puncturing pattern for an encoding with a rate ⅓ and a puncturing of 8 bits (48 to 40 bits). This corresponds to a transmission of 8 input bits. FIG. 10 shows the distribution, if instead, the puncturing pattern No. 3 from FIG. 11 is used which also has proved particularly suitable in simulations. It can be seen that here a very evenly balanced distribution is produced. Here, too, an improvement is achieved of around 0.2 dB (but no curve is shown for this since it does not provide any further insights). FIG. 16 shows further preferred exemplary embodiments as part of the present invention with a puncturing of 14 of 54 bits in which case the patterns 3 and 4 produce the best results.

FIGS. 13, 14 and 15 show preferred repetition patterns which also are obtained using the rules shown in accordance with the present invention.

The present invention has been described on the basis of use in a mobile radio transmitter. The present invention also can, of course, be extended to mobile radio receivers where, for matching the data rate in the way described above, punctured or repeated signals must be processed in accordance with the puncturing or repetition pattern used in each case. In this case, in the relevant for bits punctured on the transmit side or repeated bits, additional bits are inserted into the received bit stream or two or more bits of the receive bit stream are grouped together. For insertion of additional bits, a flag is simultaneously set in the form of a soft decision to indicate that its information content is very uncertain. The processing of the receive signal can be undertaken in the relevant receiver in the same way in reverse order to FIG. 1.

Further bit adaptation patterns determined using the inventive method explained above The puncturing patterns specified previously predominantly concentrate on puncturing in the end areas and/or repetition in the middle area.

The further rate matching patterns now described were determined in the previously explained inventive method for different proposals for HS-SCCH coding in the standardization. The bits to be punctured or to be repeated are specified in each case. The bits are numbered consecutively from 1 through N. The preferred pattern is given first in each case. The further patterns, however, always exhibit similar favourable characteristics.

FIG. 17, in which these further puncturing patterns are listed, thus represents an expansion of FIG. 12. Accordingly puncturing patterns for various output bit rates are shown in FIGS. 18-24 and further repetition patterns in FIG. 25.

Approximation of preferred rate matching patterns using components already specified in the UMTS The patterns previously shown have the aim of proposing an optimum possible selection of bits to be punctured or to be repeated, in which case no other restrictions are imposed with regard to the pattern. In practical implementations, however, it can be of advantage to only consider those patterns which can be implemented with the least possible changes to existing rate matching circuits. A corresponding rate matching specification is described in document Specification 25.212 v5.0.0 Chap 4.2.7 it "Rate Matching" which already has been mentioned. The sections below will reflect the sense of the part of this specification which undertakes the actual puncturing or repetition and which is described in Chapter 4.2.7.5 "Rate matching pattern determination."

Before rate matching, the bits are identified by $x_{i1}$, $x_{i2}$, $x_{i3}$, ... $x_{ix}$. In this case, i stands for the transport channel number, the sequence itself is defined in sections 4.2.7.4 of the Specification for the uplink and in 4.2.7.1 for the downlink. An uplink is taken to refer to a connection from a communications device to the base station, a downlink a communication from a base station to a communications device.

The rule for rate matching is reproduced in the section of the specification which runs when the condition is fulfilled that puncturing has to be performed.

First, an error value e is set to an initial value which lies between the original error value and the desired puncturing rate.

In a loop with the index m of the bit currently considered as run parameter, up to the end of the sequence, that is up to index $X_i$:

the error value e his initially set to $e_{minus}$, where $e_{minus}$ essentially represents the number of bits to be punctured;

a check is then made as to whether the error value e<=0,

In this case a check is made as to whether the bit with the index m is to be punctured, in which case a bit to be punctured is then set to a value of δ which is other than 0 or 1.

Where a repetition is to be undertaken, essentially the same procedure is performed, in which case a repeated bit is then set directly after the original bit.

For puncturing, the execution sequence then proceeds with the bits which have been set to the value δ being removed so that these bits are thus punctured.

The parameters Xi, $e_{ini}$, $e_{plus}$ and $e_{minus}$ are selected so that the desired rate for matching can be achieved. Essentially, then, $e_{plus}=Xi$, $e_{minus}=N_p$, where $X_i$ is the number of bits before rate matching and $N_p$ is the number of bits to be punctured or repeated. $e_{ini}$ can be chosen in the range between 1 and $e_{plus}$, which produces a slight shift in the pattern, bits being used in specific cases (rate matching after a first interleaving), to shift the patterns in different frames suitably in relation to one other. The parameter i identifies different transport channels in the Specification. This parameter, is however, irrelevant in this case and is thus omitted. Options are shown below for how one can approximate preferred rate matching patterns for short block sizes with convolution codes using this existing rate matching algorithm. In this case, an attempt is made under the general conditions of this algorithm to preferably use bits at the end of the code block for puncturing and for repetition to, above all, use bits from the middle of the code block. A core aspect of this exemplary embodiment is not to limit the parameter $e_{ini}$ to the range of values from 1 to $e_{plus}$, but instead to advantageously select it outside this range. Such a choice may appear contradictory at first glance since it no longer ensures that the desired number of bits are punctured or repeated. Through an advantageous matching of the values of $e_{plus}$ and $e_{minus}$, however, it is possible to the still achieve the desired number.

Let $X_i$: Number of bits before rate matching $N_p$: Number of bits to be punctured/repeated (the index p in $N_p$ refers to the number are of bits to be punctured, $N_p$ also can, however, designate the number of bits to be repeated.

To fully specify the use of the rate matching algorithm and the rate matching pattern for the initial error value $e_{ini}$, the error increment $e_{plus}$ and the error decrement $e_{minus}$ must be specified, since these parameters completely describe the rate matching pattern.

The paragraphs below illustrate the preferred rate matching patterns using the rate matching algorithm given in release 99 UTMS.

Subsequently, options are shown for how the preferred rate matching patterns already present in the standard rate matching algorithm (data rate matching algorithm) can be approximated for short block sizes with convolution codes. In this case, an attempt is made under the general condition of this algorithm for puncturing to preferably use bits at the ends of the code block and for repetition to, above all, use bits from the middle of the code block.

Puncturing

The parameters of the rate matching algorithm are selected so that the first N0 bits at the beginning of the code block are punctured, whereby the following equation must apply:

$$N_0 \cdot (e_{min\,us} - e_{plus}) < e_{ini} \leq N_0 \cdot e_{min\,us} - (N_0-1) \cdot e_{plus} \qquad (1).$$

There is provision as a further criterion for the last bit of the block to be punctured as well, this being done in accordance with the following condition:

$$(N_0-1) \cdot (e_{minus} - e_{plus}) < e_{ini} \qquad (2).$$

In this case, the value of the error variable e actually will be negative precisely for the last bit, whereby this bit is then punctured.

Both criteria are, for example, fulfilled by the following preferred selection of parameters:

$$e_{plus} = X_i - N_0 \qquad (3).$$

$$e_{min\,u} = N_p - N_0 \qquad (4).$$

$$e_{ini} = N_0 \cdot e_{min\,us} - (N_0-1) \cdot e_{plus} \qquad (5).$$

Also included in these formulae is the special case in which no bit at the beginning of the code block is to be punctured ($N_0 = 0$). Then, the following applies: $e_{ini} = X_i$, $e_{plus} = X_i$, $e_{minus} = N_p$.

The general implementations which select $e_{ini}$ in accordance with the formulae (1) to (4) produce frame matching patterns which differ from those in the preferred selection of parameters in accordance with (3) to (5) merely in that, from the $(N_0+1)$th up to the $(N_p-1)$th puncturing point, the index of the bits to be punctured can be decremented by one.

For the application example of puncturing of 48 bits to 40 bits, the table in FIG. 26 shows puncturing patterns in accordance with the preferred parameter selection up to $N_0=6$. The puncturing points not printed in bold type can be decremented by one either partly or completely by variation of the $e_{ini}$ value in accordance with (1) and (2).

The table shown subsequently in FIG. 27 shows in the same manner the resulting pattern for a puncturing of 111 bits to 80 bits.

Although this does not allow the optimum puncturing patterns which already have been discussed above to be achieved, it is still possible to achieve a certain improvement of the transmission quality compared to the current status of the specification, in which case the changes to be made are comparatively small.

Repetition

The parameters of the rate matching algorithm are calculated in accordance with the present invention, so that a maximum gap between the last bit to be repeated and the block end is guaranteed, so that the following must apply:

$$e_{ini} = 1 + X_i \cdot e_{min\,us} - N_p \cdot e_{plus} \qquad (6).$$

Furthermore, the average gap between bits to be repeated $R_R$ can be prespecified. RR does not have to be a whole number but can be a positive rational number. The following then applies:

$$R_R = \frac{e_{plus}}{e_{minus}}. \tag{7}$$

As such, $e_{plus}$ and $e_{minus}$ can be freely selected under the general condition that their quotient produces precisely $R_R$ and, in total, $N_p$ bits are to be repeated.

If the first bit to be repeated, or to put it more precisely, the position of the first bit to be repeated (designated here as $b_1$) is to be prespecified, the following equation must apply in addition to (6):

$$\frac{e_{ini}}{b_1} \leq e_{minus} < \frac{e_{ini}}{b_1 - 1}, \tag{8}$$

where $e_{minus}$ should be a whole number and $b_1 \leq X_i - N_p + 1$. A preferred parameter selection is produced for $$e_{minus} = N_p \cdot \tag{9}$$

$$e_{plus} = X_i - b_1 + 1 \tag{10}$$

$$e_{ini} = (b_i - 1) \cdot N_p + 1 \tag{11}$$

With this selection of parameters, the position of the first bit to be repeated is $b_1$ and, as required, $N_p$ bits are repeated.

Here, too, the repetition patterns produced are not optimal compared to the patterns already discussed above. Despite this, it is still possible to achieve a certain improvement in transmission quality the inventive method compared to the current state of the specification, in which case the changes to be made are again comparatively small. By selecting parameter b1 well, it is possible to achieve repetition which does not begin right at the start. At the start, repetition is not actually needed since the bits at the start of the convolution decoder as shown above in any event exhibit a comparatively low error rate. It is, thus, far more beneficial when the bits to be repeated, as occurs with the inventive method, are concentrated further towards the middle.

Of course, a combination of the criteria given above is also possible for the selection of a puncturing pattern. For example, one can combine a pattern from two of the patterns presented here by using the start of one pattern at the start and the end of the second pattern at the end. Furthermore, it makes no difference if the bits are output in a changed sequence and at the same time the puncturing pattern is adapted accordingly. For example, the sequence of the polynomials in the convolution coder can be swapped over.

Although the present invention has been described with reference to specific embodiments, those of skill in the art will recognize that changes may be made thereto without departing from the spirit and scope of the present invention as set forth in the hereafter appended claims.

The invention claimed is:

1. A method for adjusting the data rate of a data stream in a communication device such that the data stream is divided into at least one data block including transmission bits to be transmitted, comprising:
   forming the transmission bits from information-carrying input bits by an encoding process; removing specific transmission bits from a data block of the data stream for the adaptation of the data rate;
   removing the transmission bits according to a puncturing pattern;
   configuring the punctured pattern that 8 of 48 bits of the data block are punctured, and the 8 of 48 bits of the data block are bits 1, 2, 4, 8, 42, 45, 47 and 48.

2. The method according to claim 1, wherein the transmission bits to be transmitted are transmitted via the HS-SCCH corresponding to the UMTS standard.

3. A method for adjusting the data rate of a data stream in a communication device such that the data stream is divided into at least one data block which includes transmission bits to be transmitted, comprising:
   forming the transmission bits from information-carrying input bits by an encoding process; removing specific transmission bits from a data block of the data stream for the adaptation of the data rate;
   removing the transmission bits according to a puncturing pattern;
   configuring the puncturing pattern such that 31 of 111 bits of the data block are punctured, wherein the 31 of 111 bits of the data block are bits 1, 2, 3, 4, 5, 6, 7, 8, 12, 14, 15, 24, 42, 48, 54, 57, 60, 66, 69, 96, 99, 101, 102, 104, 105, 106, 107, 108, 109, 110 and 111.

4. The method according to claim 3, wherein the transmission bits to be transmitted are transmitted via the HS-SCCH corresponding to the UMTS standard.

5. A communication device, comprising:
   a rate adjustment device for puncturing or repeating a data block of a data stream supplied to the rate adjustment device according to a specific rate adjustment pattern for adjusting the data rate of the data stream, wherein
   the rate adjustment device removes or repeats corresponding bits from the data block by puncturing or repetition with respect to the rate adjustment pattern,
   the rate adjustment device is configured such that the rate adjustment is carried out on the basis of a puncturing pattern or a repetition pattern which dots 8 of 48 bits of the data block, and the 8 of 48 bits of the data block are bits 1, 2, 4, 8, 42, 45, 47 and 48.

6. The communication device according to claim 5, wherein the communication device is one of a mobile radio transmission device or mobile radio reception device.

7. The method according to claim 5, wherein the transmission bits to be transmitted are transmitted via the HS-SCCH corresponding to the UMTS standard.

8. A communication device, comprising:
   a rate adjustment device for puncturing or repeating a data block of a data stream supplied to the rate adjustment device according to a specific rate adjustment pattern for adjusting the data rate of the data stream, wherein
   the rate adjustment device removes or repeats corresponding bits from the data block by puncturing or repetition with respect to the rate adjustment pattern, and
   the rate adjustment device is configured such that the rate adjustment is carried out on the basis of a puncturing pattern or a repetition pattern which dots 31 of 111 bits of the data block, wherein
   the 31 of 111 bits of the data block are bits 1, 2, 3, 4, 5, 6, 7, 8, 12, 14, 15, 24, 42, 48, 54, 57, 60, 66, 69, 96, 99, 101, 102, 104, 105, 106, 107, 108, 109, 110 and 111.

9. The communication device according to claim 8, wherein the communication device is one of a mobile radio transmission device or mobile radio reception device.

* * * * *